(No Model.)
J. MacKENZIE.
TIRE INDICATOR.
No. 363,657. Patented May 24, 1887.
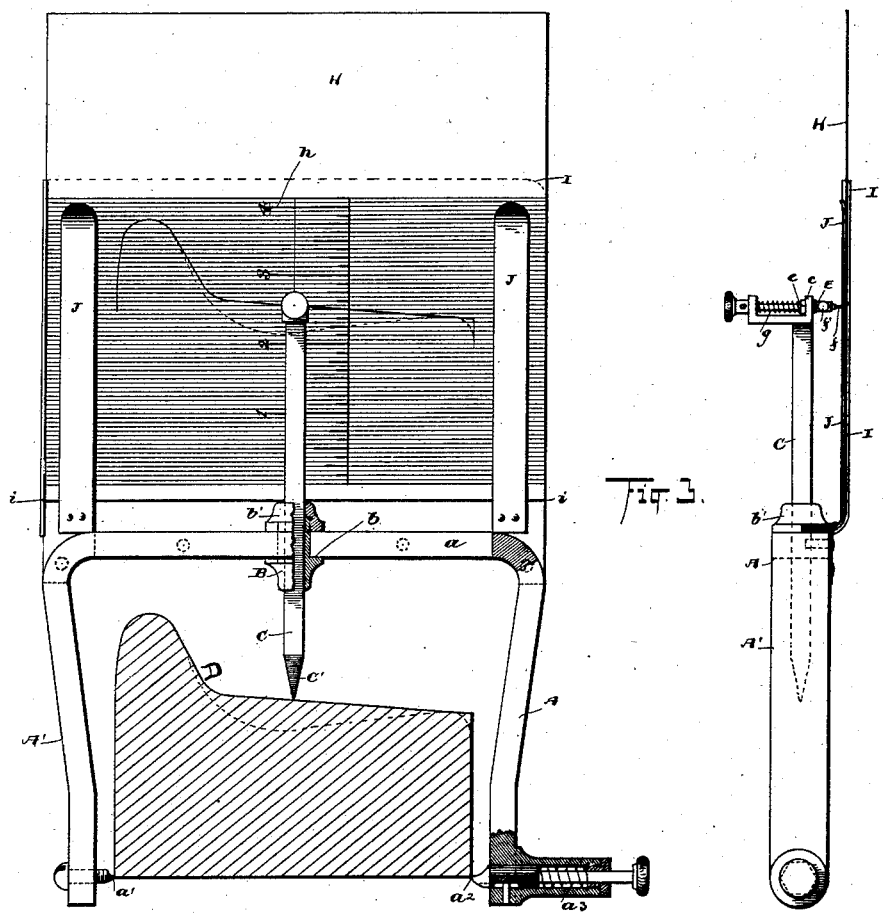
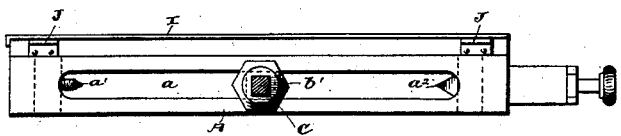
WITNESSES
N. S. Amstutz
Geo. W. King
John Mackenzie INVENTOR
By
Liggett & Liggett
Attorneys

UNITED STATES PATENT OFFICE.

JOHN MacKENZIE, OF CLEVELAND, OHIO.

TIRE-INDICATOR.

SPECIFICATION forming part of Letters Patent No. 363,657, dated May 24, 1887.

Application filed February 8, 1887. Serial No. 226,950. (No model.)

*To all whom it may concern:*

Be it known that I, JOHN MACKENZIE, of Cleveland, in the county of Cuyahoga and State of Ohio, have invented certain new and useful Improvements in Tire-Indicators; and I do hereby declare the following to be a full, clear, and exact description of the invention, such as will enable others skilled in the art to which it pertains to make and use the same.

My invention relates to an improved indicator for indicating, by a tracing made on a card, the wear on locomotive driving-wheel tires, and showing the thickness of the tire; and it consists in certain features of construction and in combination of parts hereinafter described, and pointed out in the claims.

In the accompanying drawings, Figure 1 is a side elevation, showing also the tire in section; Fig. 2 a plan, and Fig. 3 an end elevation, of an indicator embodying my invention.

A represents a metal plate or frame, made, preferably, of about the form shown in Fig. 1. The central or horizontal portion is fitted accurately, so that the top and bottom sides thereof are parallel, and has a long slot, $a$. The legs or jaws A' of the frame are made to span the driving-wheel laterally, and have points $a'$ and $a^2$ for engaging the respective sides of the wheel at the intersection of the tire and wheel, to hold the instrument in place. The point $a'$ is usually screwed in and remains stationary. The part $a^2$ may be a pointed thumb screw, or may have a spring, $a^3$, for pressing this point against the wheel. Either construction will answer the purpose. A hollow sliding stock or cross-head, B, is mounted on the part A, and made to slide lengthwise of the latter, the said stock extending through and fitting nicely in the slot $a$. A shoulder, $b$, and nut $b'$ of the stock abut against, respectively, the under and upper sides of the part A. By adjusting the nut $b'$ the vertical lost motion of the stock is taken up and the stock made to slide easily on the part A without tilting in the least. Through the vertical hole in the stock operates the rod or gage C, the parts being fitted accurately, so that the rod may move freely endwise without any lateral play. The rod and hole in the stock are usually square in cross-section, or of such shape that the rod will not turn in the socket.

The lower end of the rod or gage C at C' is rounded to travel on the face of the tire D. The upper end of the rod C is forked, the ear thereof, $c$, being pierced laterally to receive the pencil-holder E. The holder is a small tube for carrying a pencil-point, $f$, and has a thumb-screw, $f'$, for adjusting the pencil-point. The holder E has a shoulder or collar, $e$, for receiving the thrust of the spring $g$, the tension of which latter presses the pencil against the card H.

A card-holder consists of a plate, I, secured to the part A, with springs J for holding the card against the plate I. A base-line, $i\ i$, is made across the lower side of the plate I, to set the bottom of the card to.

The card H is of the variety shown, having a scale, $h$, of inches, divided into sixteenths of an inch and numbered from a zero-line upward, as shown, the smaller dimensions being marked in fine lines extending across the face of the card. The different cards are of course fac-similes of each other. The rod C is of such length that when the point C' is in line with the points $a'\ a^2$ the pencil-point $f$ will be at the zero-line of the card. Now, with the instrument adjusted as aforesaid (the points $a'\ a^2$ being at the lines of unison of the tire and wheel) and with the point C' resting on top of the tire, it is evident that the pencil-point will reach up on the card a distance above the zero-line equal to the thickness of the tire at the part where the point C' rests. Now, if the point C', commencing at one edge of the tire, is moved laterally across the face of the tire, the pencil-point $f$ will trace a line across the card that will accurately represent the face of the tire, and the distance of this tracing from the zero-line will show the thickness of the tire at corresponding points. By comparing such tracing with cards previously taken, and from the known thickness of the tire when new, an accurate estimation may be made of the wear on the tire.

A good practice is to take a "card" when the tire is new, and the same card may be used from time to time as the tire becomes worn with use, in which case the different lines traced across the card at the successive "card-takings" will show accurately the wear on the tire and the thickness of metal remaining, and thus trace in contrast with the upper tracing representing the new tire. Of course a different card may be used each time, if preferred. This instrument is extremely simple and reliable, and is comparatively cheap in initial cost, while the accuracy of its work and the ease and dispatch with which it can be manipulated render it a valuable instrument for the purpose for which it is intended.

What I claim is—

1. In a tire-indicator, the combination, with a supporting-frame made to span the wheel laterally, with contact-points made to engage the wheel, of a cross-head or stock mounted on the frame and made to travel crosswise on the tire, and a rod or gage made to slide endwise through the stock, said rod or gage being held perpendicular to the tire, substantially as set forth.

2. In a tire-indicator, the combination, with a supporting-frame, cross-head, and sliding gage, the latter having a pencil-holder attached, substantially as indicated, of a card-holder consisting of a plate secured to the supporting-frame and springs for holding the card stationary against the plate, substantially as set forth.

3. In a tire-indicator, the combination, with a card-holder having a base-line marked thereon for setting the card, a card having a zero-line, and a scale numbered upward from the zero-line, of a cross-head, pencil-holder, and mechanism substantially as indicated, with the arrangement of parts such that the pencil may be made to trace a line on the card distant from the zero-line a distance equal to the thickness of the tire at corresponding points, substantially as set forth.

In testimony whereof I sign this specification, in the presence of two witnesses, this 14th day of January, 1887.

JOHN MACKENZIE.

Witnesses:
W. E. DONNELLY,
ALBERT E. LYNCH.